Oct. 4, 1949.   S. S. BROWN   2,483,524
ELECTRIC MOTOR CONSTRUCTION
Filed Oct. 12, 1946   2 Sheets-Sheet 1
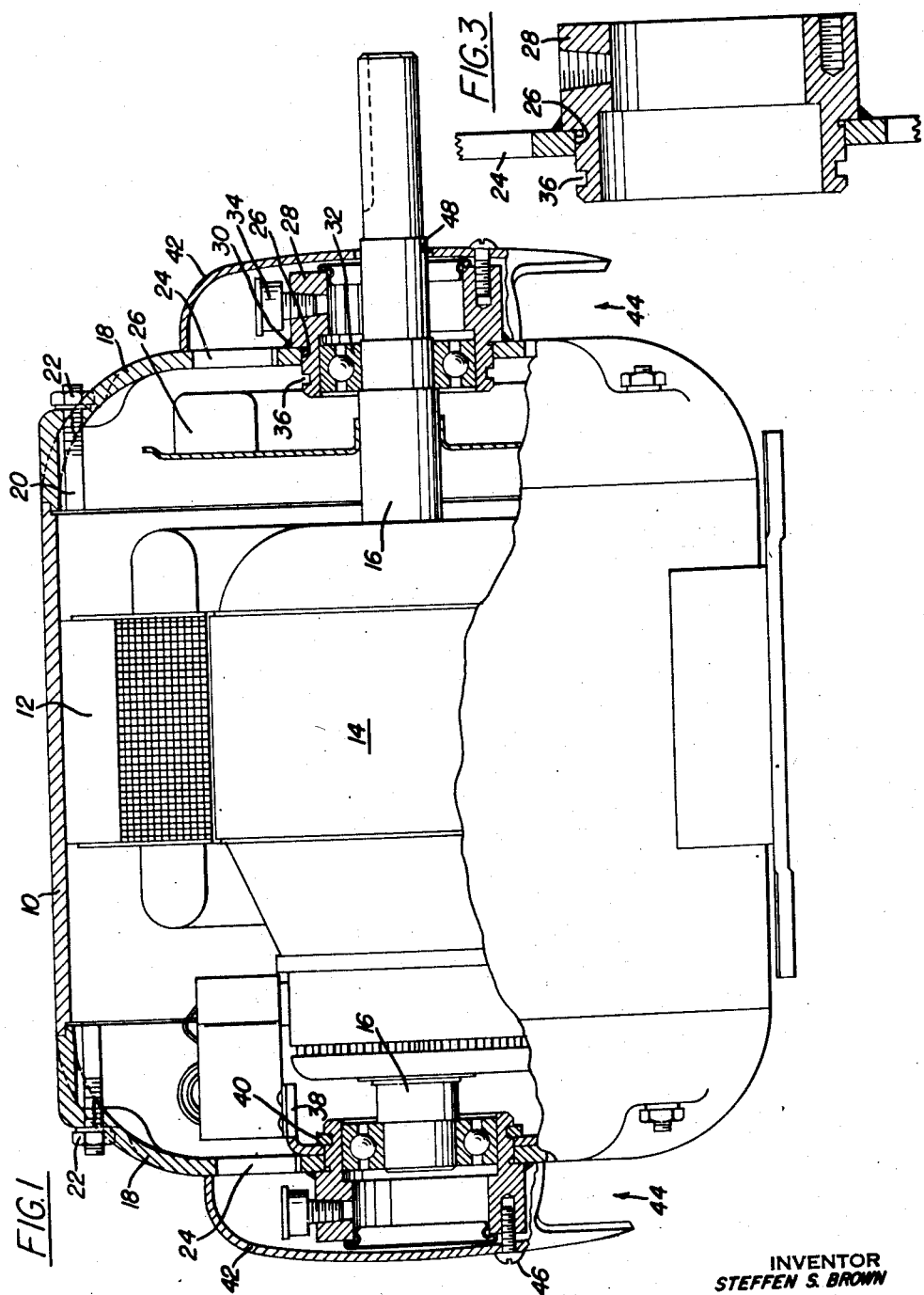
INVENTOR
STEFFEN S. BROWN
BY
ATTORNEYS Oct. 4, 1949.    S. S. BROWN    2,483,524
ELECTRIC MOTOR CONSTRUCTION
Filed Oct. 12, 1946    2 Sheets-Sheet 2
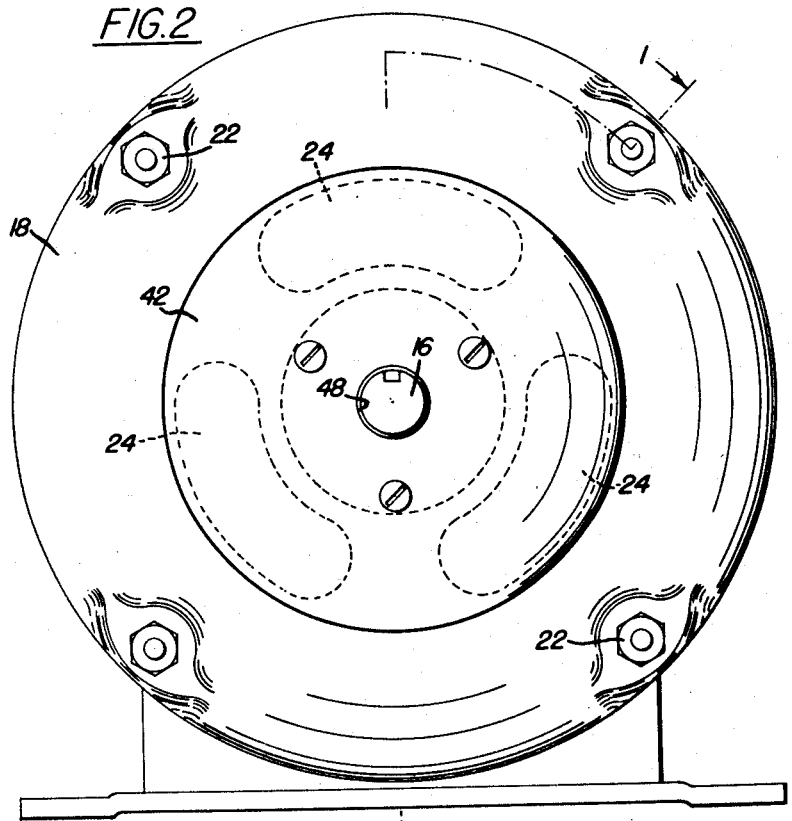
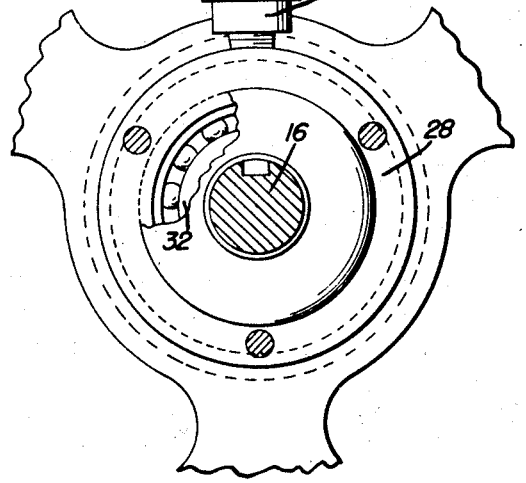
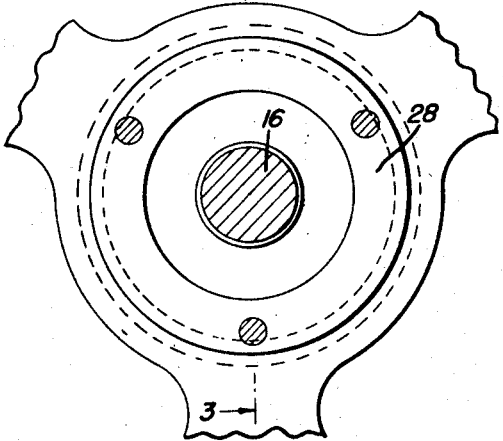
INVENTOR
STEFFEN S. BROWN
BY
Toulmin & Toulmin
ATTORNEYS Patented Oct. 4, 1949

2,483,524

UNITED STATES PATENT OFFICE 2,483,524

ELECTRIC MOTOR CONSTRUCTION

Steffen S. Brown, Dayton, Ohio, assignor to The Brown-Brockmeyer Co., Dayton, Ohio, a corporation of Ohio Application October 12, 1946, Serial No. 702,952

4 Claims. (Cl. 171—252)

This invention relates to electric motors and particularly to an improved construction thereof.

In most electric motors it is necessary that cooling air be passed over the armature and stator in order to maintain the operating temperature of the motor within the required limits. This necessitates the provision in the motor end covers of slots or apertures through which the air may be passed as it is circulated by a fan generally carried on the motor shaft and within the motor housing. The provision of such slots or apertures in the motor covers usually leads either to a complete casting or drawing or, if the apertures are positioned to open axially through the end covers, then screens or other means must be provided in order to protect the interior of the motor from objects which might pass through the apertures.

Accordingly, one of the objects of the present invention is to provide an improved motor construction wherein the motor end covers are a simple shape, having apertures therein for the motor cooling air, and in combination with which there is a means for shielding the said apertures.

Another object is to provide a motor end cover having relatively large apertures therein for cooling air passage or for inspection purposes, and in combination therewith an auxiliary shield or canopy which normally covers the apertures but which can be removed for inspection of the motor.

The usual end cover construction for an electric motor includes a means for receiving a bearing. In practically every instance it is necessary for there to be a heavier section in the end cover around the bearing than is required for the remainder of the cover. This is necessary because the axial length of any type bearing is greater than the necessary axial thickness of the end covers. This presents a definite problem when it is desired to punch and draw the said end cover from a metal sheet, and when a casting of the end covers is to be made the provision of this heavier section requires that the mold be properly cored to provide for the necessary thickness.

Thus, it is another object of this invention to provide a construction for motor end covers wherein it is not necessary to provide an additional thickness for the support of the motor bearings. Another object is to provide in combination a simple motor end cover of substantially uniform thickness and in combination therewith an additional member for supporting the motor bearing.

It is also an object to provide an improved end cover construction for electric motors wherein the end cover is a member of uniform cross-sectional thickness having inspection and air passage apertures therein, and in which there is an auxiliary member for supporting the motor bearing, and a shield or canopy protecting the motor openings and supported by the auxiliary member.

These and other objects and advantages will become more apparent upon reference to the following description taken in connection with the attached drawings in which:

Figure 1 is a side view of a motor constructed according to this invention and being partially broken away;

Figure 2 is an end elevation of the motor looking from the right end of Figure 1;

Figure 3 is a somewhat enlarged view showing the bearing supporting member and its connection with the end cover; and Figures 4 and 5 are end views looking in the same direction as Figure 2 but having the canopy removed and showing, respectively, an anti-friction bearing and a sleeve bearing.

Referring to the drawings, there is illustrated in Figures 1 and 2 an electric motor having a frame 10 within which is mounted a wound stator 12. Mounted within the bore through the stator is a rotor or armature 14 having a shaft 16 passing therethrough and projecting from each end thereof.

The motor frame 10 receives at the ends thereof end cover members 18 which are retained in position by a plurality of through studs or bolts 20 having nuts 22 thereon. The members 18 are preferably drawn from a sheet metal of sufficiently heavy gauge to provide for the necessary rigidity, but may be cast if this is indicated by individual preference. Within the end covers 18, there are a plurality of apertures 24 through which cooling air is passed over the stator and armature windings by a fan 26 which is carried on the shaft 16 and within one of the end covers. According to this invention, the apertures 24 are made sufficiently large to provide a free flow of air through the motor, and also to permit the ready inspection of the interior thereof to determine the condition of the windings on the stator and armature.

It will be noted in Figure 1, the end covers 18 are of substantially uniform thickness throughout, and are centrally apertured as at 28 to receive the bearing supporting members 28. The members 28 are preferably turned from seamless tubing for economy of material and machining, and are shouldered to fit relatively closely within the apertures 26. A ring of welding as at 30 secures each of the bearing supporting members 28 in its respective end cover 18. The members 28 are suitably recessed for receiving the bearings 32 which support the armature 14 and shaft 16. It will be understood that while anti-friction bearings are illustrated in Figure 1, sleeve bearings may be employed if desired by merely shaping the inside of the bearing supporting members properly to receive and support the sleeve bearing.

In the arrangement shown in Figure 1, the members 28 are provided with the lubricating means 34 through which lubricant, either fluid or semi-solid can be introduced for the purpose of lubricating the bearings 32. On the inside of the covers 18 the bearing members have a groove 36 therein and on the one end of the motor there may be mounted around the member 28 a brush ring 38 which is retained in position by a snap ring 40 resting in the groove 36. It will be understood that the brush ring is only necessary in cases where the armature 14 includes a commutator, as for example in the case of a direct current motor, or of a repulsion start-induction run alternating current motor, or wherever the motor type requires an armature having a commutator.

For protecting the apertures 24 in the end covers 18 to prevent an excessive amount of dirt from falling therethrough, or to prevent objects from being extended therein which would injure the interior of the motor, there is provided on each end of the motor a shield or canopy 42, which comprises a dish shaped circular member having its lower end open as at 44 for the passage of air to the apertures 24. The canopies are provided with screw holes through which pass the screws 46 into the members 28 for supporting the canopies in position. It will be apparent that the left end canopy in Figure 1 can be continuous while the canopy at the right end of the motor is required to be apertured as at 48 for the passage of the shaft 16.

It will be apparent that a motor end cover constructed according to the teachings of this invention, is neat in appearance, is relatively inexpensively fabricated because of the simple machining required, and provides adequate openings for the passage of cooling air without endangering the interior of the motor.

The use of the auxiliary bearing supporting member which is formed as a separate part and welded in the end cover, permits the use of a substantially standard unit for the end cover itself which can be accommodated to different shaft sizes and bearing types by the assembly therewith of the proper bearing supporting member.

It will be understood that this invention is susceptible to modification in order to adapt it to different usages and conditions and, accordingly, it is desired to comprehend such modifications within this invention as may fall within the scope of the appended claims.

I claim:

1. In an electric motor or the like having an end cover plate with a central aperture therein; said plate being of concavo-convex formation, a hollow sleeve extending through said aperture into the concave side of said plate and secured to said plate for supporting a bearing, means supported by said sleeve on the convex side of said cover for lubricating said bearing; ventilation apertures in said end cover arranged around said central aperture, means on said sleeve on the concave side of said cover for supporting a brush ring and means supported by said sleeve for shielding said ventilation apertures.

2. In an electric motor having a frame; an end cover for said frame comprising a dish-shaped plate of substantially uniform thickness and centrally apertured; an independent member in said aperture carried by said cover for supporting a bearing, said member being shouldered externally and bored through axially and being integrally united to said cover, said cover having a plurality of ventilating apertures spaced around said central aperture and a shield covering said ventilation apertures supported by said independent member.

3. In an electric motor having a frame; an end cover for said frame comprising a dish-shaped plate of substantially uniform thickness and centrally apertured; an independent member in said aperture carried by said cover for supporting a bearing, said member being shouldered externally and bored through axially and being integrally united to said cover, said cover having a plurality of ventilating apertures spaced around said central aperture, a shield covering said ventilation apertures supported by said independent member, and means on said independent member for rotatably and detachably supporting a brush ring.

4. In an electric motor or the like having an end cover plate of substantially uniform thickness with a central aperture therein; said plate being of concavo-convex formation, a sleeve extending through said aperture into the concave side of said plate and secured thereto for supporting a bearing, means on the convex side of said cover to introduce lubricant into said sleeve for lubricating the bearing, ventilation apertures in said end cover arranged around said central aperture, a shield covering said ventilation apertures supported by said sleeve on the convex side of said cover plate, and means including a snap ring for rotatably and detachably supporting a brush ring on said sleeve.

STEFFEN S. BROWN.

REFERENCES CITED

The following references are of record in the file of this patent:

UNITED STATES PATENTS

| Number | Name | Date |
| --- | --- | --- |
| 1,278,865 | Curtis | Sept. 17, 1918 |
| 1,317,233 | Starker | Sept. 30, 1919 |
| 1,325,232 | Cook | Dec. 16, 1919 |
| 1,490,104 | Gilchrist | Apr. 15, 1924 |
| 1,564,389 | Wheeler | Dec. 8, 1925 |
| 1,746,991 | Bucklen | Feb. 11, 1930 |
| 1,958,047 | Kamrath | May 8, 1934 |
| 2,070,718 | Ehrlich | Feb. 16, 1937 |
| 2,238,925 | Brown | Apr. 22, 1941 |
| 2,371,193 | Sigmund | Mar. 13, 1945 |
| 2,401,662 | Divi | June 4, 1946 |

FOREIGN PATENTS

| Number | Country | Date |
| --- | --- | --- |
| 16,644 | Australia | Dec. 7, 1934 |